Oct. 6, 1936.    G. ULLMANN    2,056,437
HOLDING DEVICE
Filed Nov. 27, 1935    3 Sheets-Sheet 1

Inventor
George Ullmann
By Clarence A. O'Brien and
Hyman Berman
Attorneys

Oct. 6, 1936.  G. ULLMANN  2,056,437
HOLDING DEVICE
Filed Nov. 27, 1935  3 Sheets-Sheet 2
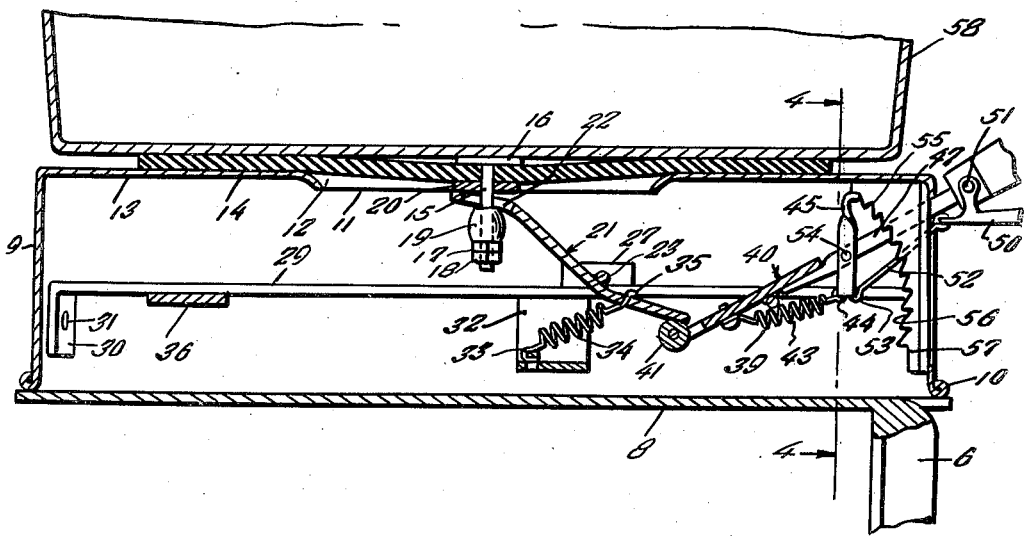
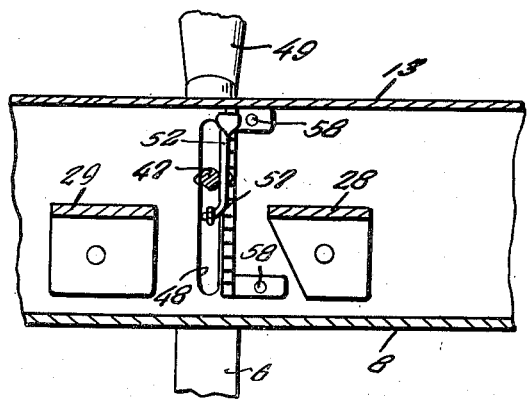
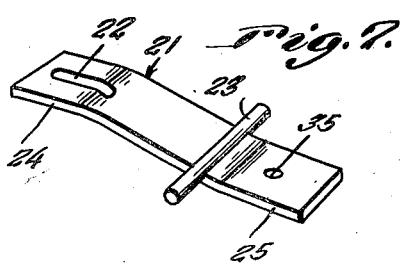
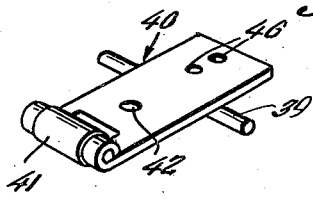
Inventor
George Ullmann
By Clarence A. O'Brien and
Hyman Berman, Attorneys Oct. 6, 1936.  G. ULLMANN  2,056,437
HOLDING DEVICE
Filed Nov. 27, 1935  3 Sheets-Sheet 3

Inventor
George Ullmann

By Clarence A. O'Brien and
Hyman Berman
Attorneys

Patented Oct. 6, 1936

2,056,437

UNITED STATES PATENT OFFICE 2,056,437

HOLDING DEVICE

George Ullmann, Milwaukee, Wis.

Application November 27, 1935, Serial No. 51,944

3 Claims. (Cl. 248—363)

My invention relates generally to holding devices, particularly to means for holding such as dishes, bowls, drinking glasses, and the like, and capable of application to hold other objects during manufacturing operations, and an important object of the invention is to provide means of this character which is readily adaptable to different forms and sizes and to a variety of mountings.

Another important object of my invention is to provide means of the character indicated above which is extraordinarily easily operable to hold or release the object.

Another important object of my invention is to provide means of the character indicated above which employs a suction principle in holding the objects.

Other important objects of my invention will be apparent from a reading of the following description in connection with the drawings, wherein for purposes of illustration I have shown a preferred embodiment of my invention.

In the drawings:—

Figure 3 is a transverse vertical sectional view taken through Figure 1 and showing the interior mechanism of the holder.

Figure 4 is a transverse vertical sectional view taken through Figure 3 approximately on the line 4—4 and looking toward the right in the direction of the arrows.

Figure 7 is a perspective view of the operating link.

Figure 8 is a perspective view of the link operator.

Figure 1:
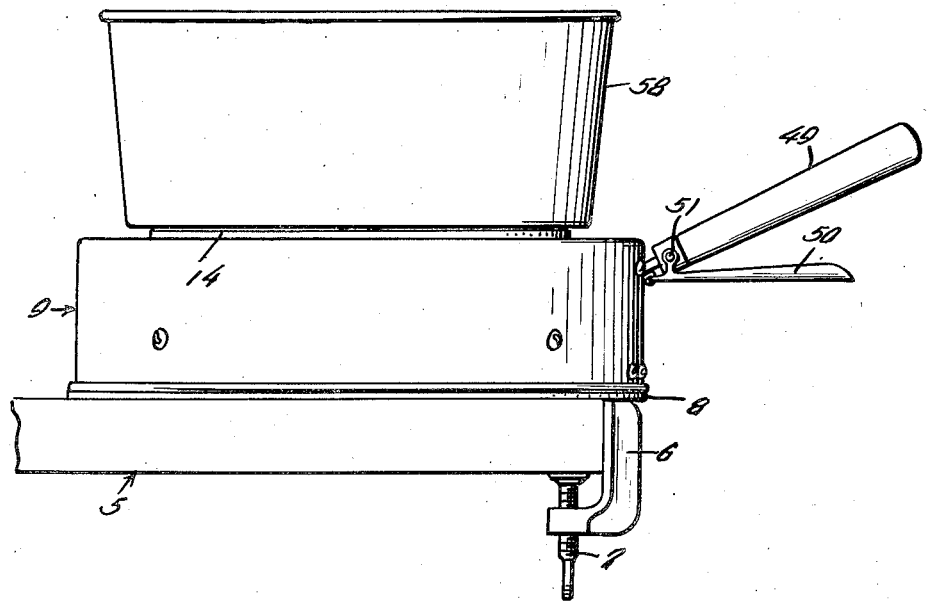
Figure 1 is a general side elevational view of the embodiment showing a pan held thereon.
Figure 2:
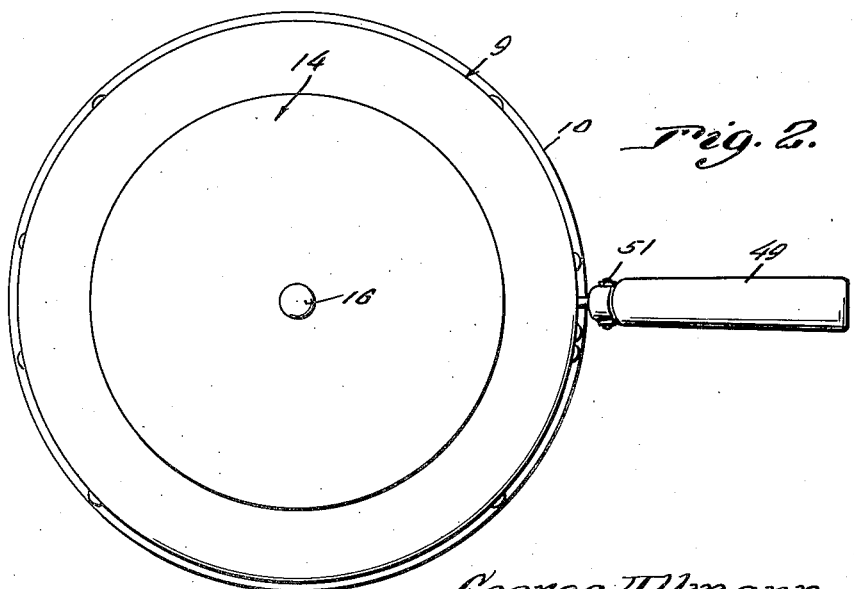
Figure 2 is a top plan view of Figure 1 with the pan removed.

Referring in detail to the drawings, the numeral 5 generally designates a table, shelf or other supporting surface, and the numeral 6 a clamp bracket having the clamping screw 7 engaging the bottom of the table top or the like, the upper end of the bracket being secured to a base 8. In accordance with the invention different types and arrangements of brackets and bases may be utilized in accordance with requirements, without departure from the invention.

The present embodiment has mounted on the base 8 the inverted pan-like casing 9 which has its lower edges rolled into a bead 10 which directly engages and is secured to the base 8.

The top of the casing has therein a circular opening 11 which has a downwardly curved lip 12. The portions of the top 13 surrounding the opening 11 and the lip 12 form the resting place for the flexible and compressible circular pad 14 which is preferably of suitable rubber and has traversing the center thereof the pin 15 which has a wide head 16 on its upper end resting upon the top of the pad, and nuts 17 and 18 threaded on its lower end and holding a rounded bushing 19 on the lower part of the pin. A washer 20 engages the lower side of the pad 14 and acts as a wear-plate and support for the upper end of the operating link 21 which is traversed by the pin 15, an opening 22 in the said upper end of the link being provided to slidably receive the pin.

On the right center portion of the operating link 21 is secured an axle 23 which has its opposite ends projecting beyond the sides of the link which is a flat bar deflected downwardly as indicated by the numeral 24 and upwardly as indicated by the numeral 25.

Figure 5:
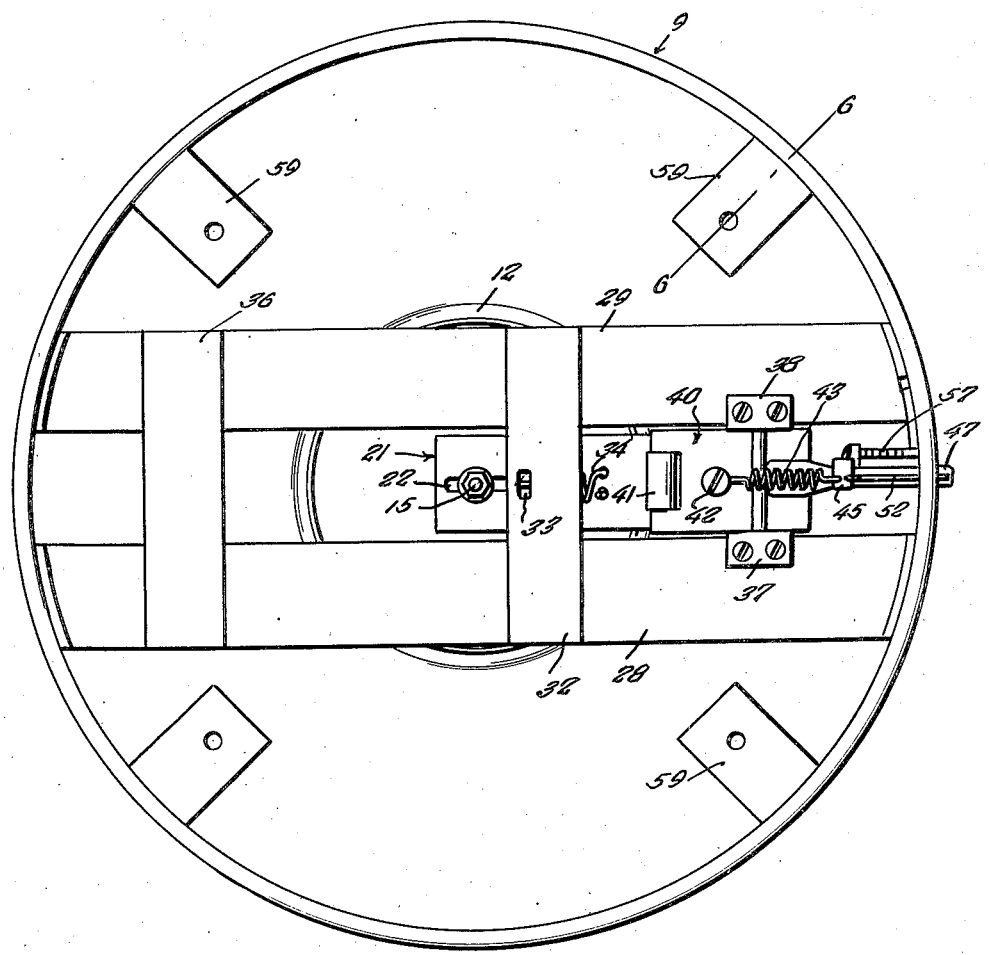
Figure 5 is a bottom plan view of the holder with the base thereof removed.
Figure 6:
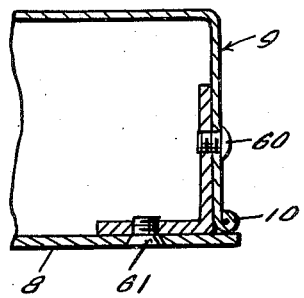
Figure 6 is a transverse vertical sectional view taken through Figure 5 approximately on the line 6—6.

The laterally extending ends of the axle 23 are journaled in brackets 27 mounted on respective cross members 28 and 29 which have downturned ends 30 fastened as indicated by the numeral 31 to the side wall of the casing 9, and are arranged in a parallel spaced manner as clearly indicated in Figure 5, on opposite sides of the approximate center of the casing.

A depending U-shaped bracket 32 is attached to the outer edge portions of the cross members 28 and 29 and the bight portion of the bracket has an upset portion 33 with which is engaged one end of a contracting helical spring 34 which has its opposite end engaged through holes as indicated by the numeral 35 in the portion 25 of the operating link 21, whereby to yieldably hold the right hand end of the operating link in a depressed position and the left hand end in an elevated position.

A flat cross member and brace 36 is fastened to the lower sides of the cross members 28 and 29 at the left hand end thereof as indicated in Figures 3 and 5.

Pivot brackets 37 and 38 are fastened to the lower sides of the cross members at their right hand ends and support the laterally extending ends of the axle 39 of the link operating member 40 which is a flat elongated plate having a roller 41 mounted at its left hand end for rolling engagement with the lower side of the portion 35 of the operating link 21 in the manner indicated in Figures 3 and 5. An opening 42 to the left of the axle 39 has connected thereto the contracting helical spring 43 which has its remaining end connected as indicated by the numeral 44 to the lower end of a dog or pawl 45.

To the right of the axle 39 the member 40 has a pair of holes 46 receiving rivets or bolts on the left hand end of the operating lever 47 whereby the member 40 is mounted to the member 47.

The operating lever 47 works through a slot 48 in the side of the casing between the right hand ends of the members 28 and 29 and has a handle 49 exterior of the casing and including a sub-lever 50 pivoted thereto as indicated by the numeral 51, the said sub-lever 50 being connected by a link 52 to the lower part of the dog or pawl 45 as indicated by the numeral 53. By this arrangement the operating lever 47 has its pivotal point on the axle 39.

The dog or pawl 45 is pivoted as indicated by the numeral 54 to the lever 47. The link 52 and the spring 43 are connected to the lower end of the dog below the lever. The upper end of the lever has a lateral tooth 55 which normally engages the ratchet teeth 56 on the ratchet member 57 which is mounted to the wall of the casing as indicated by the numerals 58.

By means of the arrangements described and with the operating lever in the position shown in Figure 3, the placing of a pan or the like 58 on the pad 14 will enable holding the pan in place on the holder simply by depressing the handle 49. In raising the left hand end of the lever and the link operating member 40, the right hand end of the operating link 21 will likewise be raised and correspondingly depress the left hand end of this link so as to draw down upon the pin 15. This movement of the pin will result in a downward pull on the center portion of the flexible pad 14 and thereby produce a vacuum suction between the pad and the bottom of the pan or other object placed on the holder.

When it is desired to release the object held in the manner indicated, the sub-lever 50 on the handle 49 is pulled upwardly so as to disengage the pawl 45 from the ratchet teeth and then to elevate the handle 49 into the initial position shown in Figure 3. This action of the parts will raise the formerly depressed center portion of the pad and in so doing dissipate the vacuum holding the pan or the like, so that the pan or the like is then free to be taken from the holder.

The excellent utility of the holder of the present invention especially for use in airliners, trains, boats, auto busses, in kitchens, on the high chairs of young children, and for use by layoutmen and plate glass cutters to hold the work tight, is believed to be obvious upon consideration.

The numerals 59 generally designate the L-shaped brackets which have their upright portion riveted as indicated or screwed as indicated by the numeral 60 to the interior of the side wall of the casing 9 and their horizontal portion screwed or riveted as indicated by the numeral 61 to the base 8, for holding the casing 9 on the base, screws being preferably used so that the case may be readily removed from the base when desired.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:—

1. A holding device of the character described, said device comprising a support including a supporting surface arranged to receive objects to be held, a flexible and compressible pad on said surface and upon which the object is placed, and means operatively connected with a center portion of said pad and operable to draw downwardly said center portion of the pad for creating a suction with the bottom of the said object and thereby holding the object in place, said means comprising a handle pivoted intermediate its ends to the support and projecting outwardly therefrom, a link pivoted to the support having one end engaging the pad and its opposite end engaged by the inner end of the handle for actuation by the handle and a latch device for releasably securing the handle, the link and the pad in suction creating position.

2. A holding device of the character described, said device comprising a support including a supporting surface arranged to receive objects to be held, a flexible and compressible pad on said surface and upon which the object is placed, and means operatively connected with a center portion of said pad and operable to draw downwardly said center portion of the pad for creating a suction with the bottom of the said object and thereby holding the object in place said means comprising a handle pivoted intermediate its end to the support and projecting outwardly therefrom, a link pivoted to the support having one end engaging the pad and its opposite end engaged by the inner end of the handle for actuation by the handle, a pawl and ratchet device operatively associated with the handle for releasably securing the handle, the link and the pad in suction creating position and a sub-handle carried by said first named handle for controlling said pawl and ratchet device.

3. A holding device of the class described, said device comprising a support including a supporting surface arranged to receive objects to be held, a flexible and compressible pad on said surface and upon which the object is placed, and means operatively connected with a center portion of said pad and operable to draw downwardly said center portion of the pad for creating a suction with the bottom of the said object and thereby holding the object in place said means comprising a handle pivoted intermediate its ends to the support and projecting outwardly therefrom, a link pivoted to the support having one end engaging the pad and its opposite end engaged by the inner end of the handle for actuation by the handle, a pawl and ratchet device operatively associated with the handle for releasably securing the handle, the link and the pad in suction creating position, a sub-handle carried by said first named handle for controlling said pawl and ratchet device and a clamping device for removably securing the support to a supporting structure.

GEORGE ULLMANN.